(12) United States Patent
Kameyama

(10) Patent No.: US 10,878,400 B2
(45) Date of Patent: Dec. 29, 2020

(54) SYSTEM AND METHOD FOR READING INFORMATION CODE FROM MOBILE TERMINAL, AND INFORMATION CODE READER PROVIDED IN THE SYSTEM

(71) Applicant: DENSO WAVE INCORPORATED, Aichi-pref. (JP)

(72) Inventor: Seiji Kameyama, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 658 days.

(21) Appl. No.: 15/639,789

(22) Filed: Jun. 30, 2017

(65) Prior Publication Data
US 2018/0005222 A1 Jan. 4, 2018

(30) Foreign Application Priority Data
Jul. 1, 2016 (JP) .................... 2016-131751

(51) Int. Cl.
*G06Q 20/32* (2012.01)
*G06Q 20/38* (2012.01)
*G06Q 20/04* (2012.01)
*G06Q 20/20* (2012.01)

(52) U.S. Cl.
CPC ......... *G06Q 20/3274* (2013.01); *G06Q 20/04* (2013.01); *G06Q 20/204* (2013.01); *G06Q 20/322* (2013.01); *G06Q 20/3276* (2013.01); *G06Q 20/388* (2013.01)

(58) Field of Classification Search
CPC combination set(s) only.
See application file for complete search history.

(56) References Cited

U.S. PATENT DOCUMENTS

| 9,953,311 | B2 * | 4/2018 | Flurscheim | ........ G06Q 20/3276 |
| 2014/0129428 | A1 * | 5/2014 | Tyler | .................. G06Q 20/3226 705/39 |
| 2014/0297441 | A1 * | 10/2014 | Thams | ................. G06Q 20/385 705/23 |

(Continued)

FOREIGN PATENT DOCUMENTS

| CN | 106886892 A | * | 6/2017 | .......... G06Q 20/388 |
| JP | 2014-071799 A | | 4/2014 | |

*Primary Examiner* — Scott A Zare
(74) *Attorney, Agent, or Firm* — Oliff PLC

(57) ABSTRACT

In the mobile terminal, a first information code is generated based on a terminal identification information and first determining information. The generated first information code is displayed by display unit provided in the mobile terminal. In the mobile terminal, the first and second determining information are acquired from a payment apparatus through reading a third information code. Based on the second determining information, a second information code is generated. Responsively to this generation, images presented on the display unit's screen are updated from a state where the first information code has been displayed so far to another state where the second information code is displayed. In a payment apparatus, an imaging unit images the second information code providing the decoded second determining information, followed by imaging first information code, further followed by performing a process based on the terminal identification information decoded together with the first determining information.

11 Claims, 8 Drawing Sheets

(56) References Cited

U.S. PATENT DOCUMENTS

| | | | |
|---|---|---|---|
| 2015/0088674 A1* | 3/2015 | Flurscheim | G06Q 20/3276 705/17 |
| 2015/0178721 A1* | 6/2015 | Pandiarajan | G06Q 20/382 705/75 |
| 2015/0248664 A1* | 9/2015 | Makhdumi | G06Q 20/3274 235/380 |

* cited by examiner

SYSTEM AND METHOD FOR READING INFORMATION CODE FROM MOBILE TERMINAL, AND INFORMATION CODE READER PROVIDED IN THE SYSTEM

CROSS-REFERENCE TO RELATED APPLICATION

This application is based on and claims the benefit of priority from earlier Japanese Patent Application No. 2016-131751 filed Jul. 1, 2016, the description of which is incorporated herein by reference.

BACKGROUND

Technical Field

The present invention relates to a system for reading an information code in which there is provided with an information code reader to optically read an information code displayed in the screen of a mobile terminal.

Related Art

There is known a system provided with an information code reader which is able to optically read an information code displayed in the screen of a mobile terminal. One of such systems is exemplified as a payment system disclosed by JP 2014-071799

In this payment system provided by JP 2014-071799, a user enters into a mobile communication terminal information showing the user and a payment amount to be paid when making payment at shops and other places. This information entered by the user is transmitted to a management server. In return, the management server generates information showing a meal ticket where the information is generated as a QR code (registered trademark) whose information including an amount of money received from the user, and then send back the generated information, that is, the QR code to the mobile communication terminal. The user than displays the QR code (i.e., the meal ticket information) on the user's terminal, and shows it to a clerk in the shop such that the QR code can be read by a shop-side terminal. The shop-side terminal then reads the presented QR code, generates information a meal fee, and sends the generated information to the management server. A series of such flows enables an on-line payment relatively smoothly.

CITATION LIST

Patent Literature

[PTL 1] JP-A 2014-071799

However, there is still a concern in the system exemplified by JP 2014-071799, due to the fact that the information code, such as a QR code (registered trademark), sent from the management server is simply displayed on the screen of a user's mobile communication terminal. Precisely, there is a concern that the displayed information code may be imaged again by other devices without user's acceptance. If such a user's unauthorized copy happens, an unauthorized process, e.g., an unauthorized payment, may be caused wrongfully by using the copied information code.

SUMMARY

It is thus desired to provide a system for reading an information code in which there is provided an information code reader which is able to securely read predetermined information which uses an information code displayed on the screen of a user's mobile terminal.

An exemplary embodiment of the disclosure provides an information coder reading system, comprising: a mobile terminal provided with a screen, an information code being displayed on the screen; and an information code reader that optically reads the information code from the mobile terminal so as to acquire predetermined information from the mobile terminal, wherein the mobile terminal comprises an acquisition section configured to acquire information from the information code reader, a code generating section configured to generate an information code, a terminal-side display provided with a screen and is configured to display, on the screen, the information code generated by the code generating section, and a display control section configured to control the terminal-side display; and wherein the information code reader comprises a reader-side imaging unit configured to image the information code displayed on the screen of the terminal-side display, a reader-side interpreting section configured to interpret the information code imaged by the reader-side imaging unit, and an information processing section configured to perform a process which uses interpreted results of the reader-side interpreting section, wherein the code generating section is configured to generate a first information code based on both the predetermined information and the first determining information, the display control section is configured to enable the terminal-side display to display the first information code on the screen thereof in response to the first information code generated by the code generating section, the acquisition section is configured to acquire, from the information code reader, both second determining information and the first determining information interpreted by the reader-side interpreting section in response to the first information code imaged by the reader-side imaging unit, the code generating section is configured to generate a second information code based on the second determining information acquired together with the first determining information when the information acquired by the acquisition section includes the first determining information, the display control section is configured to update the terminal-side display so as to change display of the first information code on the screen thereof to display of the second information code on the screen thereof, and the information processing section is configured to perform a process based on the predetermined information interpreted together with the first determining information by the reader-side interpreting section in response to imaging the first information code, when the reader-side interpreting section interprets the second determining information in response to the second information code imaged by the reader-side imaging unit.

By way of example, the first code generating section is configured to generate the first information code based on both the predetermined information and the first determining information, the second code generating section is configured to generate the second information code based on the second determining information acquired together with the first determining information if the information acquired by the acquisition section includes the first determining information and the first information code is generated based on both the predetermined information and the first determining information, and the information processing section is configured to perform a process based on the predetermined information interpreted together with the first determining information if the second determining information is interpreted by the reader-side interpreting section in response to imaging the second information code by the reader-side imaging unit.

Further, in the exemplary embodiment, by way of example, the first code generating section is configured to generate the first information code based on the first determining information, the second code generating section is configured to generate the second information code based on both the predetermined information and the second determining information acquired together with the first determining information if the information acquired by the acquisition section includes the first determining information and the first information code is generated based on the first determining information, and the information processing section is configured to perform a process based on the predetermined information interpreted together with the second determining information if the second determining information and the predetermined information are interpreted by the reader-side interpreting section in response to imaging the second information code by the reader-side imaging unit.

Further, by way of example, the first code generating section is configured to generate the first information code based on the first determining information, the second code generating section is configured to generate the second information code based on both the predetermined information and the second determining information acquired together with the first determining information if the information acquired by the acquisition section includes the first determining information and the first information code is generated based on the first determining information, and the information processing section is configured to perform a process based on the predetermined information interpreted together with the second determining information if the second determining information and the predetermined information are interpreted by the reader-side interpreting section in response to imaging the second information code by the reader-side imaging unit.

As an exemplary embodiment, according to a further mode, there is provided a method of processing an information code in a system provided with a mobile terminal provided with a terminal-side display unit with a screen and an information code reader provided with a reader-side imaging unit and a reader-side interpreting section and provided to be communicable with the mobile terminal, comprising steps of: making the mobile terminal generate a first information code serving as the information code, based on i) predetermined information and first determining information which are information in relation to identifying the mobile terminal or a user of the mobile terminal or ii) based on the first determining information; making the mobile terminal control the terminal-side display unit to display the first information code on the screen; making the information code reader image the first information code displayed on the screen of the terminal-side display unit; making the information code reader interpret the first information code imaged by the reader-side imaging unit; making the information code reader determine whether or not, in response to imaging of a second information code by the reader-side imaging unit, the reader-side interpreting section has interpreted the second determining information or both the second determining information and the predetermined information; making the mobile terminal acquire, from the information code reader, the second determining information and the first determining information imaged and interpreted by the information code reader, the first determining information being derived from the first information code displayed on the screen; making the mobile terminal determine whether or not the acquired information includes the first determining information; making the mobile terminal generate, when it is determined that the acquired information includes the first determining information, i) the second information code serving as the information code based on the second determining information acquired together with the first determining information in a case where the first information code is generated based on the predetermined information and the first determining information, or ii) the second information code serving as the information code based on both the second determining information acquired together with the first determining information and the predetermined information in a case where the first information code is generated based on the first determining information; making the mobile terminal update the screen of the terminal-side display unit from a state where the first information code is displayed on the screen to another state where the second information code is displayed on the screen, in response to the generated second information code; and making the information code reader perform a process based on the predetermined information interpreted by the reader-side interpreting section together with the first determining information or the second determining information, when the second determining information or both the second determining information and the predetermined information has been interpreted.

Effects of the Invention

According to the foregoing exemplary embodiment, the code generating section of the mobile terminal generates the first information code according to the terminal identification information and the first determining information. The first information code is then displayed on the screen of the terminal-side display unit under control of the display controller. In the mobile terminal, when succeeding in acquiring from the information code reader, through reading the third information code, the second determining information and the first determining information decoded after imaging of the first information code by the terminal-side imaging unit, the second information code is generated according to the second determining information. The terminal-side display unit updates, under control of the display controller, its screen from currently display of the first information code to display of the second information code. Then, in the information code reader, the second determining information is decoded by the reader-side interpreting section in response to imaging the second information code by the reader-side imaging unit. In response to this decoding, the terminal identification information (such as identification information) decoded together with the first determining information in response to imaging the first information code is subjected to a process for the payment.

In this way, after imaging the first information code displayed on the terminal-side display unit and decoding the terminal identification information and the first determining information, the information code reader images the second information code updated and displayed on the terminal-side display unit and decodes the second determining information. In response to this decoding of the second determining information, the information code reader then performs the payment process according to the terminal identification information decoded in advance. This means that, even if an unauthorized and copied information code has been imaged by the information code reader without imaging a second information code which follows the first information code, the payment process according to the terminal identification information is not allowed.

In particular, in the mobile terminal, it is determined whether or not the terminal has acquired the first determining information from the information code reader. Meanwhile, in the information code reader, it is determined whether or not the apparatus acquires the second determining information by imaging and decoding the second information code displayed on the mobile terminal. This results in mutual authentication, thus improving a security performance in the system.

Furthermore, the second determining information decoded from the second information code can be set feely by the information code reader. It is thus difficult for third parties to acquire this second determining information, thus making it difficult to generate the second information code in an unauthorized manner. Accordingly, the terminal identification information (i.e., the predetermined information) can be read securely by the information code reader by using the information codes displayed on the mobile terminal.

As another example, in the mobile terminal, the first information code is generated on the first determining information, and the first information code is displayed by the terminal-side display unit, which is under control of the display controller. And both the second determining information and the first determining information decoded from the first information code imaged by the terminal-side imaging unit are acquired, from the information code reader, with use of reading the third information code. This acquisition is followed by generating the second information code based on both the second determining information and the terminal identification information. The second information code is then displayed by the terminal-side display unit under control of the display controller, so that the screen of the terminal-side display unit is updated from an image display where the first information code has been presented to a further image display where the second information code is now displayed. Meanwhile, in information code reader, when both the second determining information and the terminal identification information are decoded in response to the imaging process imaging the second information code by the reader-side imaging unit, a process for the payment according to the terminal identification information is carried out.

In this way, after imaging the first information code displayed on the terminal-side display unit and decoding the first determining information, the information code reader images the second information code updated and displayed on the terminal-side display unit, and decodes the second determining information and the predetermined information. In response to this decoding, the information code reader then performs the payment process according to the terminal identification information. This means that, even if an unauthorized copied information code has been imaged by the information code reader without imaging a second information code which follows the first information code, the payment process according to the terminal identification information is not allowed.

In particular, in the mobile terminal, it is determined whether or not the terminal has acquired the first determining information from the information code reader. Meanwhile, in the information code reader, it is determined whether or not the reader acquires the second determining information by imaging and decoding the second information code displayed on the mobile terminal. This results in mutual authentication, thus improving a security performance in the system.

Furthermore, the second determining information decoded from the second information code can be set feely by the information code reader. It is thus difficult for third parties to acquire this second determining information, thus making it difficult to generate the second information code in an unauthorized manner. Accordingly, the terminal identification information can be read securely by the information code reader by using the information codes displayed on the mobile terminal.

In another embodiment, the information code reader is provided with the reader-side display unit capable of displaying the third information code generated according to the first and second determining information. The mobile terminal is provided with the terminal-side imaging unit imaging the third information code and the terminal-side interpreting section acquiring the first and second determining information by decoding the imaged third information code.

Hence, as long as the system is provided as a standard system which includes a mobile terminal with the imaging unit, and an information code reader with the display unit, the mobile terminal can optically read the third information code displayed by the information code reader. As a result, without using wireless communication, the mobile terminal is able to acquire the first and second determining information from the information code reader. This makes it possible to adopt this system in places such as medical fronts where use of the wireless communication is limited.

Furthermore, a payment process can be performed by the information processing section based on payment information acquired through decoding carried out by the reader-side interpreting section. Hence, in a payment system in which information codes displayed on the mobile terminal are made to be read by the information code reader in order to enable the payment process, the information code reader can securely read the information about making the payment.

In another embodiment, as the mobile terminal is provided with the first determining information generating section generating the first determining information composed of random data, it becomes extremely difficult for third parties to know this random first determining information. Security performance in treating the terminal identification information can thus be improved.

In another embodiment, the first determining information generating section generates the first determining information on the basis of information acquired by, at least any one of the sensors of the mobile terminal. In the embodiment, the mobile terminal is provided with sensors such as an illuminance (luminance levels) sensor, a proximity sensor, a gyro sensor, an acceleration sensor, a GPS sensor, a magnetic sensor, a battery-power residual sensor, a pedometer sensor, a timer sensor, and/or a sensor which detects information from images obtained. Information from one or more ones of these sensors are used to generate the first determining information. Such information cannot be imagined at all by third parties, resulting in strengthened security in using the predetermined information.

In another embodiment, the information code reader is provided with the second determining information generating section generating the second determining information composed of random data. Such information cannot be imagined by third parties, resulting in further strengthened security in using the predetermined information In another embodiment, the second determining information generating section generates the second determining information composed of random data on the basis of information acquired by, at least any one of the sensors of the information code reader. In the embodiment, the information code reader is provided with sensors such as an illuminance (luminance levels) sensor, a proximity sensor, a GPS sensor, a magnetic sensor, a timer sensor, and/or a sensor which detects information from images obtained. Information from one or more ones of these sensors are used to generate the second determining information. Such information cannot be imagined by third parties, resulting in further strengthened security in using the predetermined information.

BRIEF DESCRIPTIONS OF THE DRAWINGS

Figure 7A:
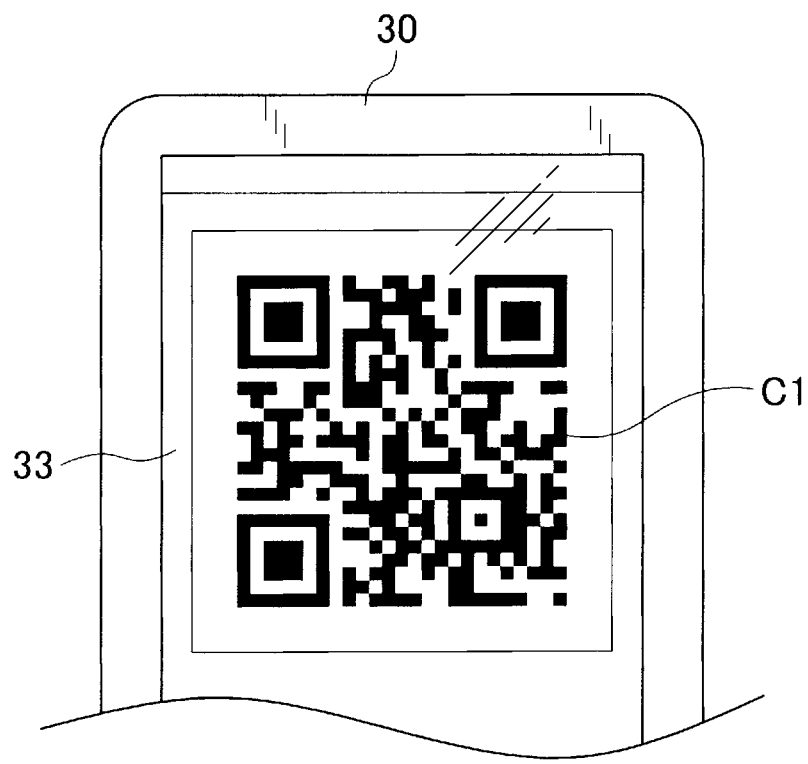
Figure 7B:
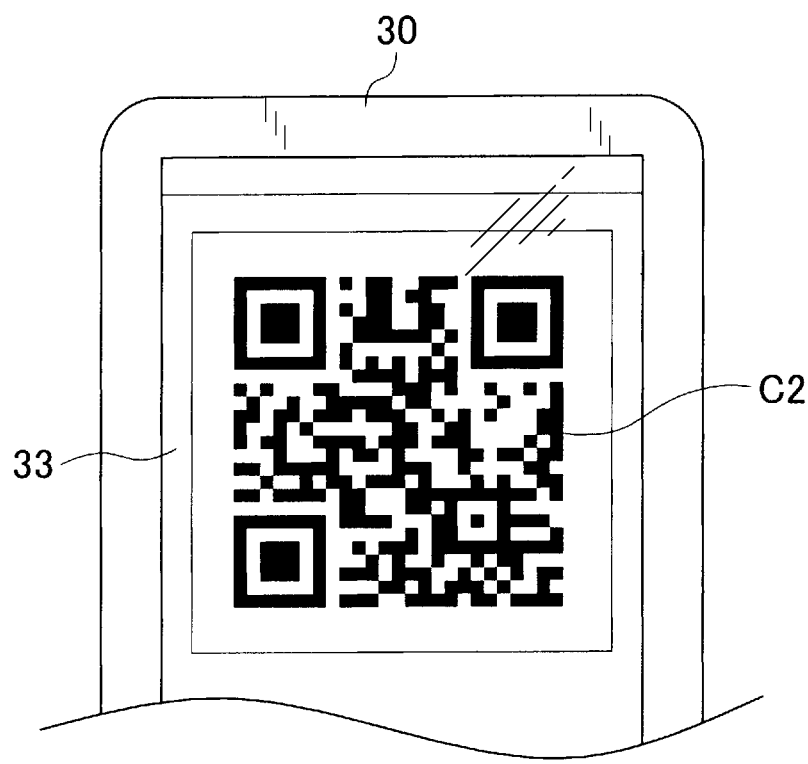
Figure 8:
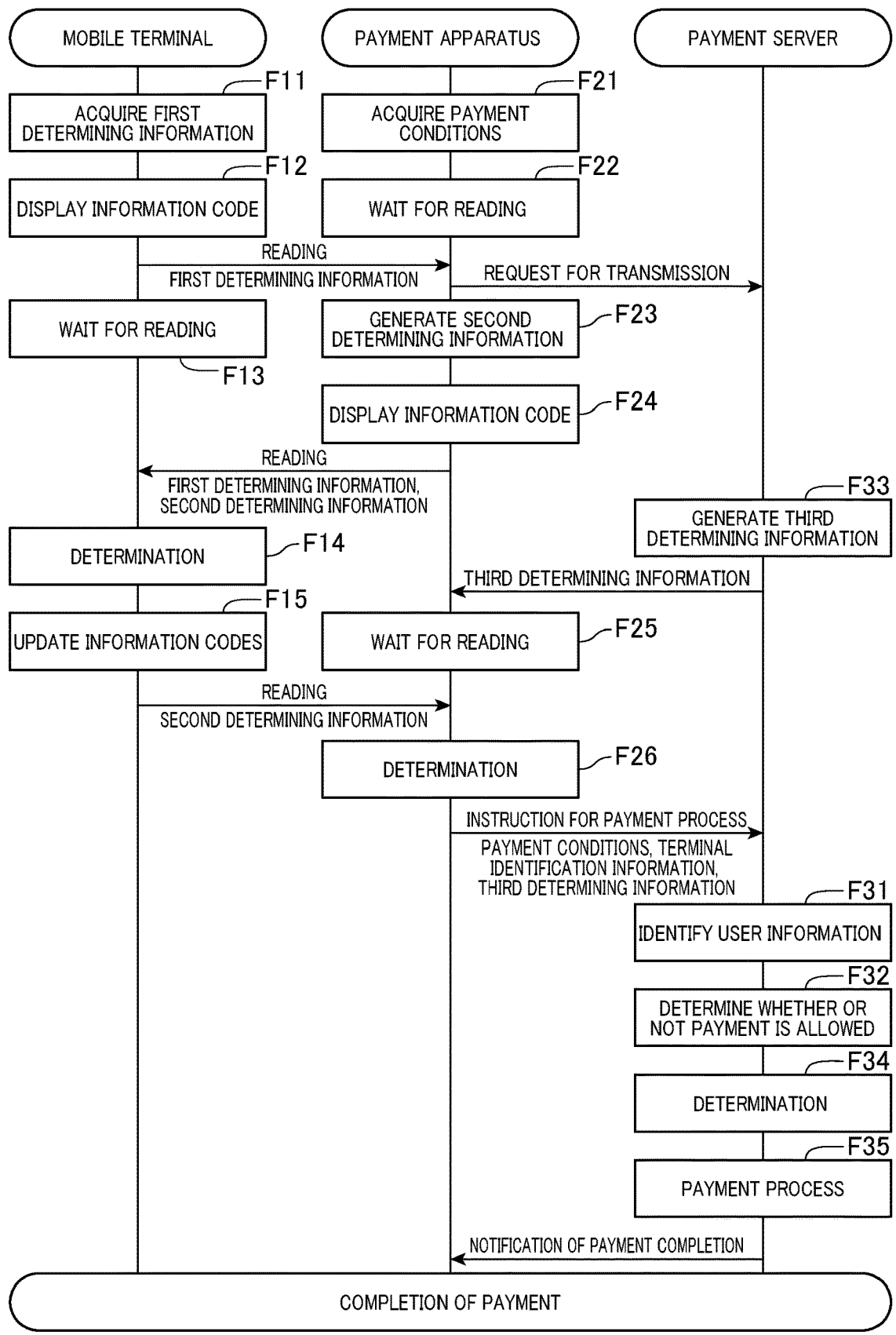

FIGS. 7A and 7B are illustrations explaining how information codes are updated and displayed on a display unit of the mobile terminal, in which FIG. 7A shows the information code C1 displayed on the screen and FIG. 7B shows the information code C2 displayed on the screen; and FIG. 8 is a sequence chart exemplifying the overall flow of the payment processes which utilize information codes in the second embodiment.

DETAILED DESCRIPTIONS OF VARIOUS EMBODIMENTS

First Embodiment

With reference to the accompanying drawings, a payment system according to a first embodiment of the present invention will now be explained, wherein an information code reading system, a method of reading the information code, and a mobile terminal installed in the reading system are practiced.

Figure 1:
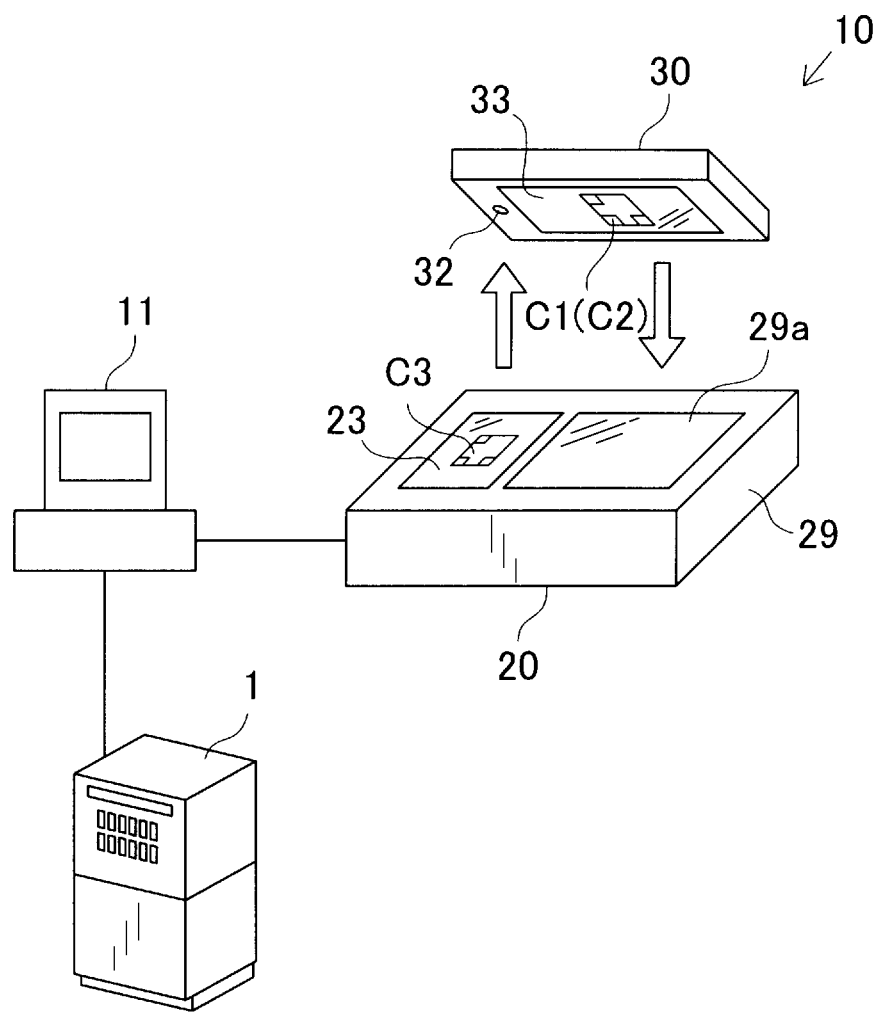
FIG. 1 is an illustration outlining the configuration of a payment system according to a first embodiment.

There is provided a payment system 10 according to the present embodiment, which is directed to an information code reading system which is able to make payment with use of an information code. Various types of information including money-related information is stored. As shown in FIG. 1, the payment system 10 is configured to include a payment apparatus 20 and a mobile terminal 30. The payment apparatus 20 is provided in shops or other places and the mobile terminal 30 is capable of displaying an information code on its screen.

Figure 2:
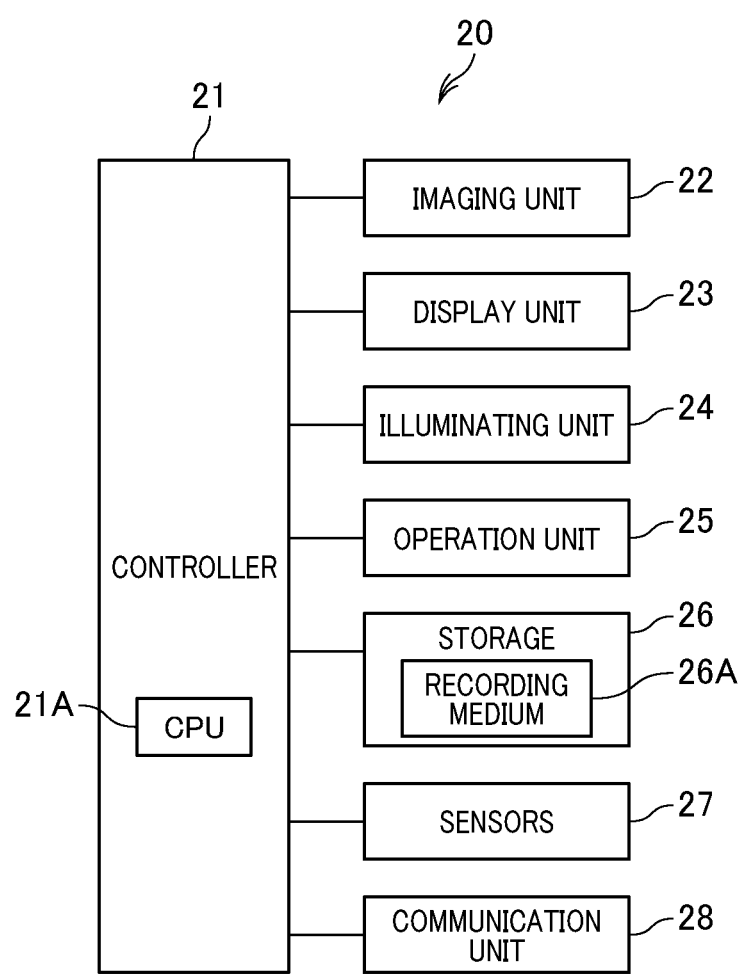
FIG. 2 is a block diagram exemplifying the electric configuration of a payment apparatus shown in FIG. 1.

With reference to FIGS. 1 and 2, the configuration of the payment apparatus 20 will now be explained.

The payment apparatus 20 is located close to a POS register used to sell goods at settlement places in shops such as convenience stores and eating houses. The payment apparatus 20 is provided as a stationary type of information code reading apparatus, with which information codes for payment are optically read to communicate with the POS register 11 in relation to predetermined information and other information obtained by the mobile terminal 30.

As shown in FIG. 2, the payment apparatus 20 is provided with a controller 21 having a CPU 21A, an imaging unit 22 configured as an optical camera with a light receiving sensor (for example, a C-MOS area sensor, a CCD area sensor), a display unit 23 having a liquid crystal display, an illuminating device 24 having LEDs, an operation unit 25 having various operating keys (not shown), a storage 26 having a ROM, a RAM and nonvolatile memory devices, various types of sensors 27, and a communication unit 28 configured as a communication interface which performs wire communication or wireless communication with extremal devices including the POS register 11.

As shown in FIG. 1, the payment apparatus is provided with a casing 29 which covers inside components thereof. The casing has an upper surface and the display unit 23 has a display screen which is formed in the upper surface. In this upper surface, a reading window 29a is also formed. the imaging unit 22 is provided as a reader-side imaging unit capable of an information code, and is arranged so that the imaging unit 22 is able to receive light reflected from an information code or others held over the reading window 29a and image such objects. The display unit 23 serves as a reader-side display unit, and the display screen thereof is arranged to enable the imaging unit 32 of the mobile terminal 30 to image the display screen, when the mobile terminal 30 is held over the reading window 29a, as will be detailed later.

In the storage 26 of the payment apparatus 20 described above, an application program for a reader-side payment process described later is stored in advance so that the application program can executed by the controller 21 (i.e., the CPU 21A). Executing this application program makes it possible to perform a payment process which utilizes an optically read information code. For this purpose, in the storage 26, there is provided a recording medium (which is a non-transient computer readable recording medium) 26A which is composed of a ROM and/or nonvolatile memories. The foregoing application program is previously stored in the form of source codes in this recording medium 25A. This application program can be read by the CPU 21A, and executed according to its steps described in the program.

When preforming this reader-side payment process, the payment apparatus 20 is configured to communicate with the POS register 11 or a payment server 1 communicably connected via a given network. The reader-side payment process will be detailed later.

The various types of sensors 27 are provided as acquisition means or devices which acquire various types of information in relation to the payment apparatus 20 itself and surrounding conditions thereof. The sensors include an illuminance (luminance levels) sensor, a proximity sensor, a GPS sensor, a magnetic sensor, a timer sensor, and/or a sensor which detects information from images obtained.

Figure 3:
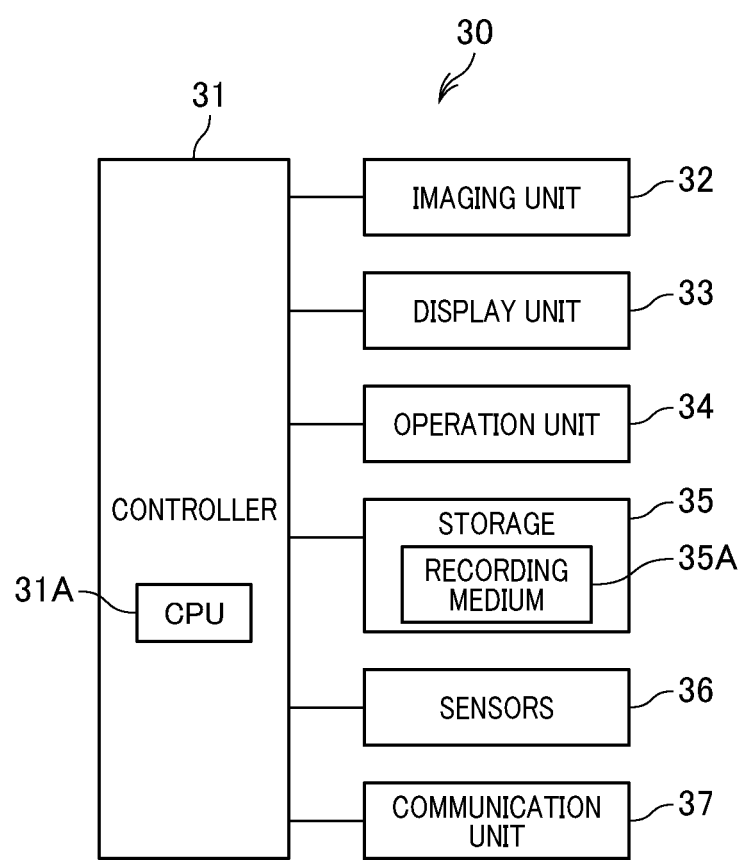
FIG. 3 is a block diagram exemplifying the electric configuration of a mobile terminal shown in FIG. 1.

With reference to FIGS. 1 and 3, the mobile terminal 30 will now be described in terms of its configuration.

The mobile terminal 30 is a portable device which can be carried by a user who desires to utilize a payment serve on information codes. The mobile terminal 30 is configured as a terminal having a telephone function, such as cell phones or smartphones. As shown in FIG. 3, the mobile terminal 30 is provided a controller 31 having a CPU 31A, an imaging unit 32 configured as an optical camera with a light receiving sensor (for example, a C-MOS area sensor, a CCD area sensor), a display unit 33 having a liquid crystal display, an operation device 34 provided as various operating keys and a touch panel (not shown), a storage 35 having a ROM, a RAM and nonvolatile memory devices, various types of sensors 36, and a communication unit 37 configured as a communication interface which performs wire communication or wireless communication with extremal devices including the payment apparatus 20, via given communication networks such as telephone networks or a direct commination form. The imaging unit 32 exemplifies a terminal-side imaging unit.

The display unit 33, which is controlled by the controller 31, functions as a terminal-side display unit capable of displaying various kinds of information, such as information codes and character information. The controller 31 functions as a display controller which controls contents displayed on the display screen of the display unit 33.

The storage 35 is a device in which terminal identification information and an application program for a terminal-side payment process are stored in advance. The terminal identification information is used for identifying the mobile terminal 30 as a predetermined information (or preset information) utilized for payment. The application program can be executed by the controller 31 (i.e., the CPU 31A). Executing this application program by the controller 31 executes results in performance of a terminal-side payment process which utilizes an information code generated based on the terminal identification information and other information, which are stored in the storage 35. This terminal-side payment process will be detailed later.

For the above purpose, the storage 35 is provided with the recording medium (which is a non-transient computer readable recording medium) 35A composed of a ROM and/or nonvolatile memories. The foregoing application program is stored in this recording medium 35A in advance. The application program is read by the CPU 31A and executed, step by step, according to the steps of the program.

The various sensors 36, which function as acquiring means or devices to acquire information in relation to the mobile terminal 30 itself and surrounding conditions, include various devices such as an illuminance (luminance levels) sensor, a proximity sensor, a gyro sensor, an acceleration sensor, a GPS sensor, a magnetic sensor, a battery-power residual sensor, a pedometer sensor, a timer sensor, and/or a sensor which detects information from images obtained.

The terminal-side payment process executed by the controller 31 of the mobile terminal 30 and the reader-side payment process executed by the controller 21 of the payment apparatus 20, which are necessary in payment with use of an information code, will now be explained.

In the present embodiment, two information codes displayed by the mobile terminal 30 such that the two information codes which have been displayed represent information such as a terminal identification information are read sequentially by the payment apparatus 20. This is interpreted as a payment instruction issued by a true authentic user, so that a payment process instruction is sent to the payment sere r 1, thereby staring payment which utilizes the read terminal identification information.

Practically, the terminal-side payment process is executed by the mobile terminal 30 and the reader-side payment process is executed by the payment apparatus 20. Such processes include the following steps. In the mobile terminal 30, the terminal identification information and first determining information described later are used to generate an information code C1 serving as a first information code. In the payment apparatus 20, the information code C1 is read to acquire the first determining information, and this first determining information and second determining information described later are used to generate an information code C3 serving as a third information code and display the information code C3. Furthermore, in the mobile terminal 30, the information code C3 is read to generate the second determining information, and based on this second determining information, an information code C2 serving as a second information code is displayed. When the second determining information is generated by the payment apparatus 20 itself by reading the information code C2, an instruction for performing the foregoing payment process is transmitted form the payment apparatus 20 to the payment server 1.

In the present embodiment, by way of example, the two information codes C1 and C2 displayed on the mobile terminal 30 and the information code C3 displayed on the payment apparatus 20 are composed of QR codes (registered trademark). Embodiments are not limited to this code example, but can be practiced by employing other types of information codes such as one-dimensional codes, including a bar code, or two-dimensional codes such as DataMatrix codes and MaxiCodes.

Hereinafter, with reference so FIGS. 4 to 7A and 7B, the terminal-side payment process and the reader-side payment process both according to the present embodiment will be detained. FIG. 6 summarizes an example of a whole flow of the payment processes carried out by an authentic user who has a right to use the mobile terminal 30.

First, referring a flowchart shown in FIG. 4, the terminal-side payment process executed by the controller 31 of the mobile terminal 30 will now be described.

When a user who visits a shop preforms given operations on the operation unit 34 of the mobile terminal 30, the controller 31 starts the terminal-side payment process. First, a step for generating the first determining information is executed at step S101 in FIG. 4, whereby the first determining information which is composed of random information is generated on a known technique (refer to step F11 in FIG. 6). A step for generating an information code is then executed at step S103, whereby an information code C1 is generated to have random information based on both terminal identification information which has been memorized by the storage 35 and the randomly-generated first determining information. Incidentally, when performing the step S101, the controller 31 functionally corresponds to an example of a first determining information generating section. Further, when preforming the step S103 and a later-described step S113, the controller 31 functionally corresponds to an example of a code generating section (first and second code generating sections).

A step for displaying the information code is then executed at step S105, where the generated information code C1 is displayed on the display screen of the display unit 33 (refer to step F12 in FIG. 6). This display state in which the information code C1 is presented continues until completion of a later-described information code update step.

Imaging is then performed by using the imaging unit 32 (step S107), and images provided by this imaging step are then subjected to a known decoding process (step S109). Until reading a later-described information code in this decoding process, the determination at step S111 shows NO, thus repeating the foregoing steps S107 to S111. This repletion state shows a waiting state in which the processing waits for reading the information code C3 (refer to step F13 in FIG. 6). Hence, when executing the step S109, the controller 31 functionally corresponds to an example of a terminal-side interpreting section. When executing the steps S107 and S109, the controller 31 and the imaging unit 32 functionally realizes an example of an acquisition section capable of acquiring information from the payment apparatus 20.

During this repetition of steps S107 to S111, the user holds the mobile terminal 30 over the payment apparatus 20, as illustrated in FIG. 1, such that the imaging unit 22 is able to image the display screen of the display unit 33 via the reading window 29a and also the imaging unit 32 is able to image the display screen of the display unit 23. This makes it possible to image the information code C3 displayed on the display unit 23 (step S107) and decode the information code C3 to provide the first determining information and the second determining information (step S109).

When it is determined that the information code C3 has been read in response to acquisition of the first and second determining information (YES at step S111 and step F14 in FIG. 6), a step for generating an information code is executed at step S113. In this step, an information code C2 is generated based on the first and second determining information both decoded. The process proceeds to step S115 in which the information codes are updated, whereby the generated information code C2 is newly displayed in the display screen of the display unit 33 (refer to step F15 in FIG. 6). That is, the display screen of the display unit 33 is automatically updated from a state where the information code C1 has been displayed, as shown in FIG. 7A, to a new state where the information code C2 is newly displayed, as shown in FIG. 7B. When the information code C2 has been displayed continuously for a preset period of time, the terminal-side payment process is ended.

Referring to a flowchart shown in FIG. 1, the reader-side payment process performed by the controller 21 of the payment apparatus 20 will now be detailed.

When a good being purchased by the user has decided, the reader-side payment process is started by the controller 21. Responsively to this start, a step for acquiring payment conditions is executed at step S201 in FIG. 5, in which payment conditions, such as prices, are acquired from reading results of, for example, a bar code attached to the good (refer to step F21 in FIG. 6). Imaging is conducted by the imaging unit 22 via the reading window 29a (step S203), and images resulting from this imaging process are subjected to decoding based on a known technique (step S205). Until the information code C1 displayed by the display unit 33 of the mobile terminal 30 has decoded through the decoding process, the determination NO will come out in the determination step S207, so that steps S203 to S207 are repeated. That is, a waiting time for completion of reading the information code C1 continues (step F22 in FIG. 6). When executing the step S205 and a later-described step S219, the controller 21 functionally realizes an example of a reader-side interpreting section During this repeated processing, the mobile terminal 30 is held over the payment apparatus 20 as illustrated in FIG. 1, and the information code C1 displayed on the display unit 33 is imaged (step S203). The imaged information code C1 is then subjected to a decoding process, resulting in that the terminal identification information and the first determining information are acquired from the information code C1 (step S205).

When it is determined that the information code C1 has been read (YES at step S207) due to the fact that both the terminal identification information and the first determining information has been acquired, the processing proceeds to step S209. At this step, a process for information transmission to the server is performed so that the payment conditions and the terminal identification inflation which have been acquired already are sent to the payment server 1.

Then the processing proceeds step S211, in which a process for generating the second determining information is performed, whereby the second determining information is generated to have random information using a known technique (refer to F23 in FIG. 6). In the present embodiment, when the controller executes step S211, the controller functionally realizes an example of a second determining information generating section.

The processing then proceeds to step S213, in which an information code generating process is carried out. Practically, by this process, both the first determining information acquired by reading the information code C1 and the randomly-generated second determining information are used to generate an information code C3. Then an information code displaying process is performed at step S215, in which the generated information code C3 is displayed on the display screen of the display unit 23 (step F24 in FIG. 6).

In a state where the information code C3 is displayed on the display screen of the display unit 23, the mobile terminal 30 is held over the payment apparatus 20 as described (refer to FIG. 1). In this state, on the display unit 33 of the mobile terminal 30, the display screen has been updated from a display state where the information code C1 is displayed to a display state where the information code C2 is displayed (refer to step S115). Hence the information code C2 displayed by the display unit 33 is subjected to be imaged (step S217), and the imaged information code C2 is decoded to provide the second determining information therefrom (step S219).

In contrast, if the display unit 33 displays the information code C1 on its screen without update to displaying the information code C2, the determination at step S221 shows NO. In this case, this determination at step S221 is repeated through step S223 and step S217 as long as determination at step S223 shows NO. At step S223, it is determined whether or not a predetermined period of time lapses. That is, the processing waits for reading the information code C2 (step F25 in FIG. 6).

As described, when the second determining information has been acquired, it is determined that the information code C2 has been read (YES at step S221 and step F26 in FIG. 6). In this case, a step S225 is executed for determining whether or not third determining information has been received from the payment server 1, where the third determining information shows a payment allowance notification. When executing the step S225 and subsequent steps, the controller 21 functionally realizes an example of an information processing section. This section is able to perform a process which utilizes decoded results, based on the terminal identification information (i.e., predetermined information) transmitted to the payment server 1 in advance.

In the payment server 1, in response to reception of the payment conditions and the terminal identification information from the payment apparatus 20, information showing the user is identified from the terminal identification information (refer to step F31 in FIG. 6), and it is determined wither or not the payment is allowed (refer to step F32 in FIG. 6). If the determination shows that the payment is allowed, the third determining information is generated to have random information by use of a known technique (refer to F33 in FIG. 6), and the randomly-generated third determining information is transmitted as a payment allowance notification to the payment apparatus 20.

In the payment apparatus 20, responsively to reception of the third determining information (i.e., the payment allowance notification) transmitted from the payment server 1 (YES at step S225), the processing proceeds to step S227 for a process for transmitting the payment process instruction. Hence the received third determining information is transmitted as the payment process instruction to the payment server 1.

In the payment server 11, it is thus determined whether or not the third determining information, which has been received as the payment process instruction from the payment apparatus 20, agrees with the third determining information transmitted to the payment apparatus 20 (refer to step F34 in FIG. 6). If this determination shows an agreement between the received and transmitted contents of the third determining information, a payment process is then carried out using the payment conditions and the terminal identification information sent from the payment apparatus 20 (step F35 in FIG. 6). After completion of this payment process, a notification showing the payment completion is sent from the payment server 1 to the payment apparatus 20.

When the payment apparatus 20 receives the payment completion notification from the payment server 1 (YES at step S229), the payment apparatus 20 proceeds to step S231 to perform a notification process. By this notification process, the display unit 23 presents given information showing the payment completion and/or the illumination unit 24 presents a given illuminated state showing the payment completion, thereby notifying the user of completion of the payment desired by the user. Then the reader-side payment process ends. In this way, the user who has received this notification can recognize the payment completion.

Meanwhile, the payment server 1 may determine either that the received terminal identification information is not allowed for the payment or that the transmitted and received contents of the third determining information are disagree with each other. In such a case, the payment server 1 sends to the payment apparatus 20 a notification showing that the payment is not allowed.

In response to reception of the payment non-allowance notification from the payment server 1, the payment server 20 determines NO at step S225 due to no reception of the third determining information. In this case, the processing also proceeds to step S223 for reporting, where the display unit 23 is controlled to display predetermined information thereon and/or the illumination unit 24 is controlled to provide a predetermined illuminated state, which reports that the mobile terminal 30 held over the payment apparatus 20 cannot be used for he payment, when it is determined that the terminal identification information received by the payment server 1 is not allowed to be used for the payment. Similarly, when it is determined that the transmitted and received contents of the third determining information are not consistent with each other in the payment server 1, the display unit 23 is controlled to display predetermined information thereon and/or the illumination unit 24 is controlled to provide a predetermined illuminated state, which reports that the payment is not allowed through this payment apparatus 20.

In cases where a person who obtains the information code C1 without authorization tries to make the payment apparatus 20 read the information code C1, the image information code cannot be updated to the information code C2, although the step S207 determines YES. Hence, the processing continues to repeat the NO determination at step S221 until the predetermined period of time elapses. An elapse of the predetermined period of time turns the determination of step S223 to YES, which is then followed by the report process at step S233. Accordingly, in the similar manner described, the display unit 23 is controlled to display the predetermined information and/or the illumination unit 24 is controlled to provide the predetermined illuminate state, thereby reporting that the currently held information code over the payment apparatus 20 by the person is not allowed for making payment.

In this way, in the payment system 10 according to the present embodiment, the mobile terminal 30 is used to generate the information code C1 according to the terminal identification information and the first determining information. The information code C1 is then displayed on the screen of the display unit 33 under control of the controller 31. In the mobile terminal 30, when succeeding in acquiring from the payment apparatus 20, through reading the information code C3, the second determining information and the first determining information decoded in response to imaging of the information code C1 by the imaging unit 32, the information code C2 is generated according to the second determining information. The display unit 33 updates, under control of the controller 31, its screen display from currently display of the information code C1 to display of the information code C2. Then, in the payment apparatus 20, the second determining information is decoded in association with imaging the information code C2 by the imaging unit 22. In response to this decoding, the terminal identification information decoded together with the first determining information in association with imaging the information code C1 is subjected to a process expressed by the step S225 and subsequent step.

As described, after imaging the information code C1 displayed on the display unit 33 and decoding the terminal identification information and the first determining information, the payment apparatus 20 images the information code C2 updated and displayed on the display unit 33 and decodes the second determining information. In response to this decoding of the second determining information, the payment apparatus 20 then performs the payment process according to the terminal identification information decoded in advance. This means that, even if an unauthorized copied information code C1 has been imaged by the payment apparatus 20 without imaging an information code C2 which follows the information code C1, the payment process according to the terminal identification information is not allowed.

Figure 4:
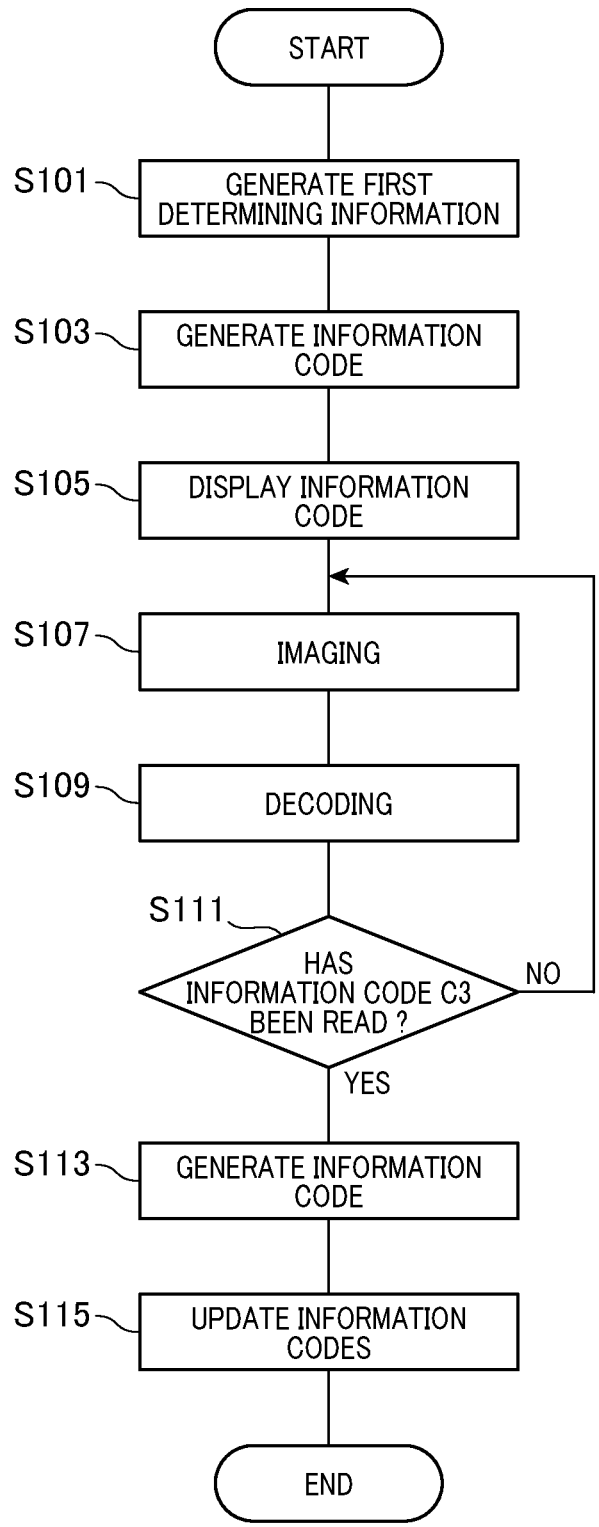
FIG. 4 is a flowchart exemplifying a flow of a terminal-side payment process performed by the mobile terminal.

In particular, in the mobile terminal 30, it is determined whether or not the terminal has acquired the first determining information from the payment apparatus 20 (refer to step S113 in FIG. 4). Meanwhile, in the payment apparatus 20, it is determined whether or not the apparatus acquires the second determining information by imaging and decoding the information code C2 displayed on the mobile terminal 30 (refer to step S221 in FIG. 5). This results in mutual authentication, thus improving a security performance in the system.

Furthermore, the second determining information decoded from the information code C2 can be set feely by the payment apparatus 20. It is thus difficult for third parties to acquire this second determining information, thus making it difficult to generate the information code C2 in an unauthorized manner. Accordingly, the terminal identification information (i.e., the predetermined information) can be read securely by the payment apparatus 20 by using the information codes displayed on the mobile terminal 30.

In addition, the payment apparatus 20 is provided with the display unit 33 capable of displaying the information code C3 generated according to the first and second determining information. The mobile terminal 30 is provide with the imaging unit 32 imaging the information code C3 and the controller 31, serving as the terminal-side interpreting section, acquiring the first and second determining information by decoding the imaged information code C3.

Hence, as long as the system is provided as a standard system which includes a mobile terminal, like the foregoing mobile terminal 30 with the imaging unit, and a payment apparatus, like the payment apparatus 20 with the display unit, the mobile terminal 30 can optically read the information code C3 displayed by the payment apparatus 20. As a result, without using wireless communication, the mobile terminal 30 is able to acquire the first and second determining information from the payment apparatus 20. This makes it possible to adopt this system in places such as medical fronts where use of the wireless communication is limited.

In addition, at step S101 in FIG. 4, as the mobile terminal 30 is configured to generate the first determining information composed of random data, it becomes extremely difficult for third parties to know this random first determining information. Security performance in treating the terminal identification information can thus be improved.

Figure 5:
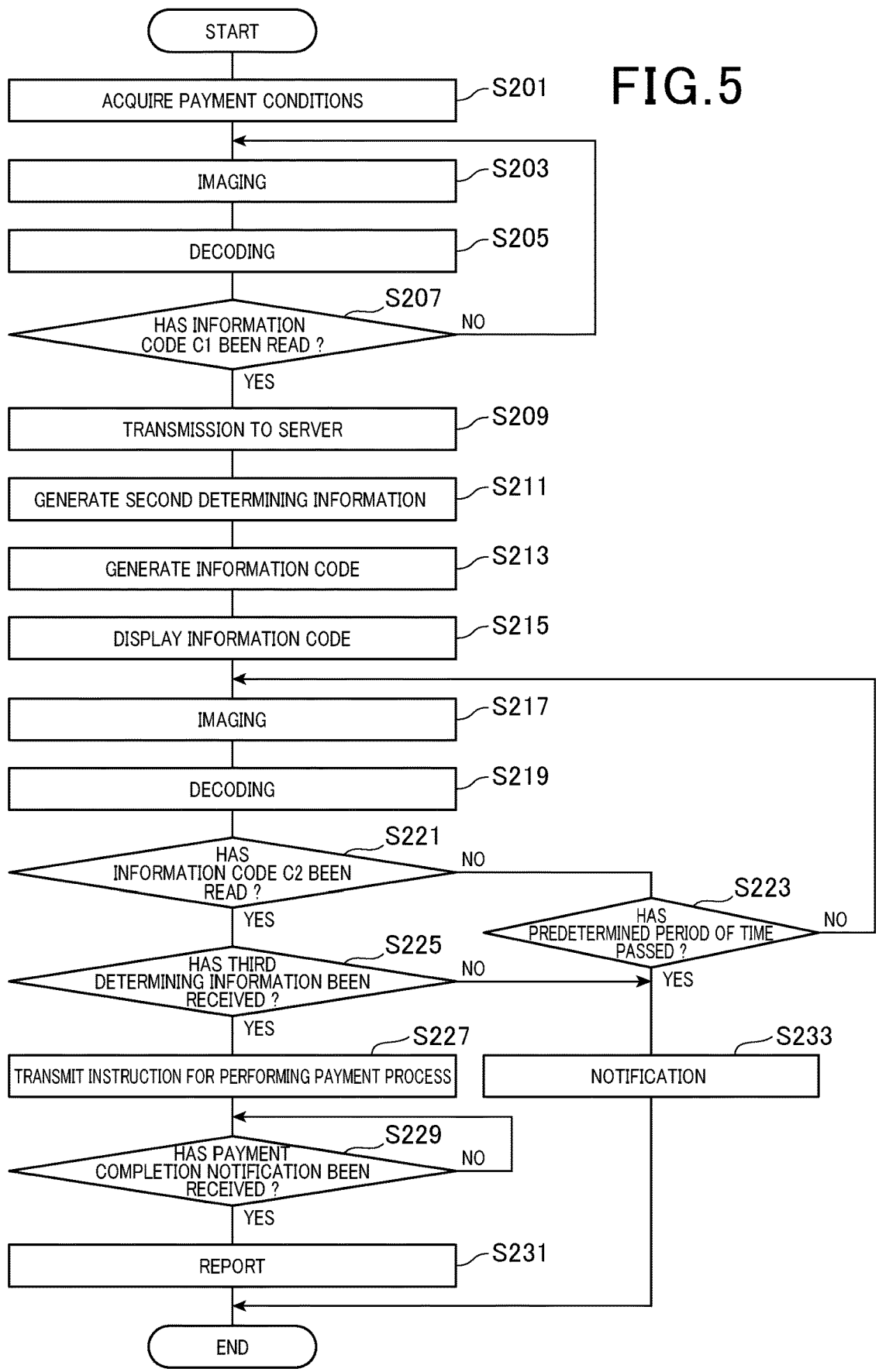
FIG. 5 is a flowchart exemplifying a flow of a reader-side payment process performed by the payment apparatus.
Figure 6:
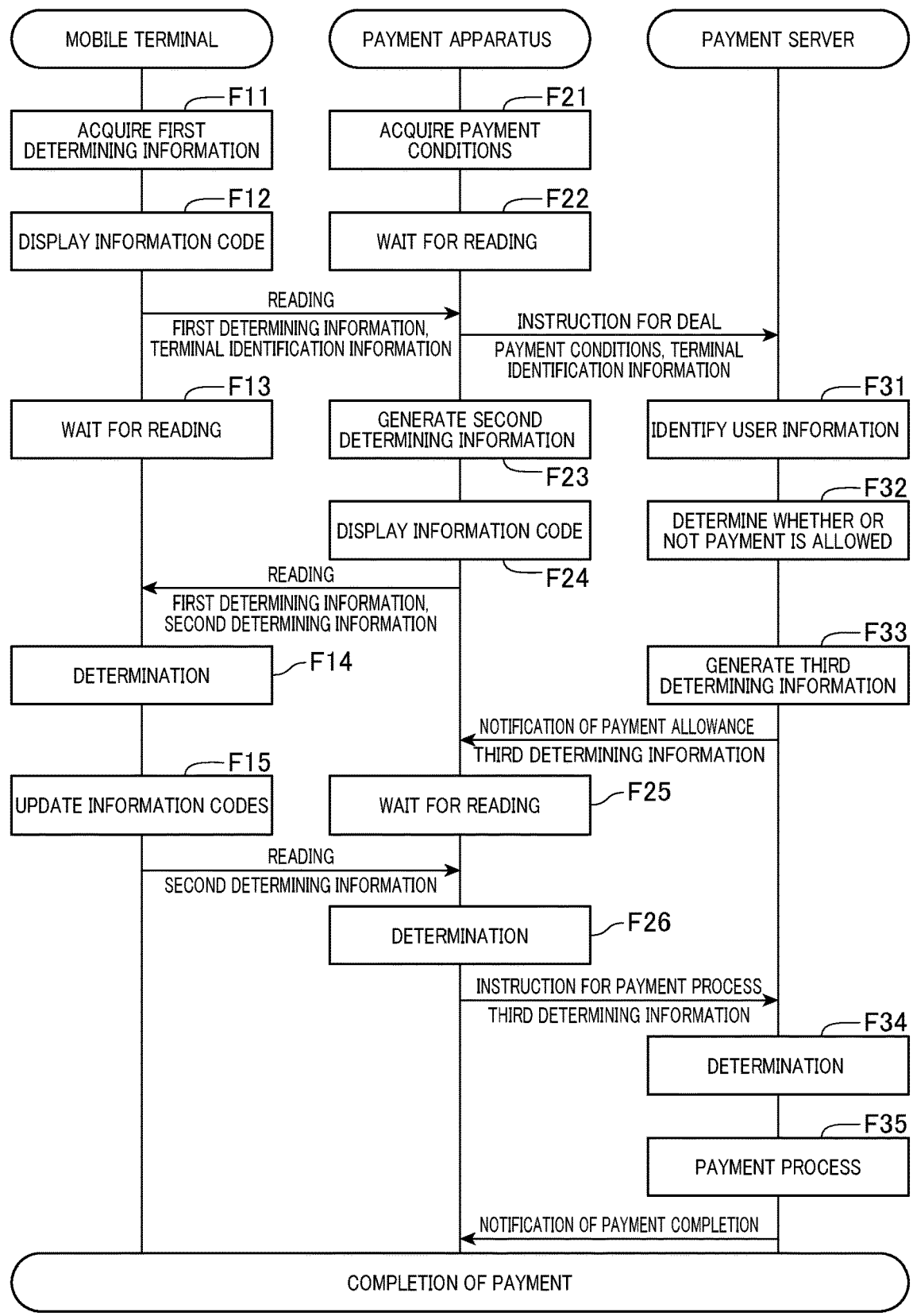
FIG. 6 is a sequence chart exemplifying the overall flow of the payment processes which utilize information codes in the first embodiment.

At step S211 in FIG. 5, as the payment apparatus 20 is also configured to generate the second determining information composed of random data, it becomes extremely difficult for third parties to know this random second determining information. Security performance in treating the terminal identification information can thus be strengthened from this aspect.

Furthermore, in the process for generating the first determining information shown at step S101 in FIG. 4, the first determining information can be given random data on the basis of information acquired by, at least any one of the sensors 36 of the mobile terminal 30. In the embodiment, the mobile terminal 30 is provided with sensors such as an illuminance (luminance levels) sensor, a proximity sensor, a gyro sensor, an acceleration sensor, a GPS sensor, a magnetic sensor, a battery-power residual sensor, a pedometer sensor, a timer sensor, and/or a sensor which detects information from images obtained. Information from one or more ones of these sensors are used to generate the first determining information. Such information cannot be imagined at all by third parties, resulting in strengthened security in using the terminal identification information (i.e., the predetermined information).

Similarly, in the process for generating the second determining information shown at step S211 in FIG. 5, the second determining information can be given random data on the basis of information acquired by, at least any one of the sensors 27 of the payment apparatus 20. In the embodiment, the payment apparatus 20 is provided with sensors such as an illuminance (luminance levels) sensor, a proximity sensor, a GPS sensor, a magnetic sensor, a timer sensor, and/or a sensor which detects information from images obtained. Information from one or more ones of these sensors are used to generate the second determining information. Such information cannot be imagined at all by third parties, resulting in further strengthened security in using the terminal identification information (i.e., the predetermined information).

Second Embodiment

With reference to FIG. 8 and necessary drawings used in the first embodiment, a payment system according to a second embodiment of the present invention will now be explained, wherein an information code reading system is practiced as the payment system. In the second embodiment, for a simplified explanation, the same or equivalent components as or to those in the first embodiment are given the same reference numbers, focusing on different points between the first and second embodiments.

A payment system 10 according to the second embodiment differs mainly from the payment system according to the first embodiment in that the terminal identification information is decoded from the information code C2 updated and displayed, not from the information code displayed at the first stage.

Practically, in the mobile terminal 30, an information code C1, which is the first information code, is displayed according to the first determining information, while in the payment apparatus 20, an information code C3 is displayed which is the third information code produced based on both the first determining information obtained by reading the information code C1 and the second determining information. Further, in the mobile terminal 30, an information code C2, which serves as the second information code, is generated based on both the second determining information obtained by reading the information code C3 and the terminal identification information. In the payment apparatus 20, the second determining information is generated by the apparatus itself via reading the information code C2, and the terminal identification information and payment conditions are sent to the payment server 1 as a payment process instruction.

With reference to a sequence chart shown in FIG. 8 and the flowcharts shown in FIGS. 4 and 5, the terminal-side payment process and the reader-side payment process will now be detailed.

In the similar manner to the first embodiment, the mobile terminal 30 enables the controller 31 to start the terminal-side payment process, so that the first determining information is generated randomly by using a known technique (step S101 in FIG. 4; step F11 in FIG. 8. The first determining information is used to generate the information code C1 (step S103), and this information code C1 is displayed on the screen of the display unit 33 (S105 in FIG. 4 and step F12 in FIG. 8). The processing then proceeds to weighting for reading the information code C3 (step F13 in FIG. 8).

When the mobile terminal 30 images the information code C3 displayed by the display unit 23 of the payment apparatus 20 (step S107), this information code C3 is decoded to acquire the first and second determining information (step S109). Then proceeding to step S111, where it is determined whether or not the information code C3 has been read through the foregoing acquisition of the first and second determining information. When being determined that the information code C3 has been read (YES at step S111 in FIG. 4; step F14 in FIG. 8. Then, using the second determining information and the terminal identification information stored in the storage 35, an information code C2 is generated (step S113), and the information code C2 is displayed by the display unit 33 (step S115 in FIG. 4; step F15 in FIG. 8). This display causes the display unit 33 to be changed automatically from a display state where the information code C1 is displayed to a further display state where the information code C2 is displayed.

In the payment apparatus 20, similarity to that of the first embodiment, the controller 21 starts the reader-side payment process, so that payment conditions are acquired. (Step S201 in FIG. 5; step F21 in FIG. 8). Then the processing waits for reading the information code C1 (steps S203 to S207 in FIG. 5; step F22 in FIG. 8). When the information code C1 displayed on the display unit 33 is imaged (step S203, the information code C1 is subjected to decoding so as to provide the first determining information (step S205). Acquiring this first determining information provides a determination that the information code C1 has been read (YES at step S207), which is followed by issuing to the payment server 11 a request for transmitting the foregoing third determining information (step S209).

In the payment apparatus 20, when the second determining information is generated randomly (step S211 in FIG. 5; step F23 in FIG. 8), the first determining information acquired through reading the information code C1 and the second determining information generated above are subjected to generate an information code C3 (step S213), which is then displayed by the display unit 23 (step S215 in FIG. 5; step F24 in FIG. 8). The processing then waits for reading the information code C2 (steps S217 to S221 in FIG. 4; step F25 in FIG. 8).

When the information code C2 displayed on the display unit 33 is imaged (step S217), this information code C2 undergoes decoding to acquire the second determining information and the terminal identification information therefrom (S219). This acquisition of the second determining information provides a determination that the information code C2 has been read (YES at step S221; step F26 in FIG. 8). Further, when having received the third determining information from the payment server 1 (YES at step S225), a process for transmitting a payment process instruction is issued (step S227), whereby the terminal identification information and payment conditions acquired from the mobile terminal 30 and the third determining information received as above are transmitted to the payment server 1 as the payment process instruction.

Meanwhile, the payment server 1 executes steps as follows. The payment server 1 transmits the third determining information generated as above, to a payment apparatus 20 from which the transmission request for the third determining information has issued (step F33 in FIG. 8). Then, when receiving from the payment apparatus 20 a payment process instruction including the third determining information, the terminal identification information and the payment conditions, the identification information is used to identify information about a user (step F31 in FIG. 8), and it is determined whether or not the payment is accepted and allowed (step F32 in FIG. 8). When it is determined that the payment is accepted and allowed, the processing proceeds to the following steps. First, it is checked whether or not the third determining information received as the payment process instruction from the payment apparatus 20 agrees with the third determining information transmitted to the payment apparatus 20 as above. If this determination is YES, i.e., both contents of the third determining information agree with each other (step F34 in FIG. 8), a payment process is performed based on the payment conditions and the terminal identification information both have been acquired from the payment apparatus 20 (step F35 in FIG. 8). In response to completion of the payment process, a notification showing the payment completion is transmitted from the payment server 1 to the payment apparatus 20 now communicating with the server.

When receiving the payment completion notification from the payment server 1 (YES at step S229 in FIG. 5), the payment apparatus 20 commands the display unit to present predetermined information display and/or the illumination unit 24 to present a predetermined illuminated state, thereby notifying the user of completion of the payment (step S231), before ending the reader-side payment process.

As described, in the mobile terminal 30 of the payment system 10 according to the second embodiment, the information code C1 is generated on the first determining information, and the information code C1 is displayed by the display unit 33, which is under control of the controller 31. And both the second determining information and the first determining information decoded from the information code C1 imaged by the imaging unit 32 are acquired, from the payment apparatus 20, with use of reading the information code C3. This acquisition is followed by generating the information code C2 based on the second determining information and the terminal identification information. The information code C2 is then displayed by the display unit 33 under control of the controller 31, so that the screen of the display unit 33 is updated from an image display where the information code C1 has been presented to a further image display where the information code C2 is now displayed. Meanwhile, in the payment apparatus 20, when both the second determining information and the terminal identification information are decoded via the imaging process imaging the information code C2 by the imaging unit 22, a process according to the terminal identification information is carried out in the steps S225 and subsequent steps.

Therefore, in a similar way to the first embodiment, if an unauthorized copied information code C1 is imaged by the payment apparatus 20, the process based on the terminal identification information is not allowed. Imaging the information code C2 following imaging the information code C1 is absolutely necessary for performance of such process. Further, similarly to that in the first embodiment, the mutual authentication between the mobile terminal 30 and the payment apparatus 20 is required, thereby strengthening security of the system. It is difficult to produce the information code C2 without a true user's agreement, resulting in that it is possible to make the payment apparatus 20 read securely the terminal identification information (the predetermined information) using the information codes displayed on the mobile terminal 30

The present invention will not be limited to the foregoing embodiments, but can be practiced in the following modifications.

(1) One modification relates to the foregoing predetermined information acquired from the mobile terminal 30 to the payment apparatus 20 by reading the information code C1 or C2. This predetermined information will not be the terminal identification information described above, but may be, for example, information showing a payment process, such as a prepaid balance or a deferred-payment credit line.

(2) Another modification relates to the forgoing payment system 10 in which the information codes C1 and C2 displayed on the mobile terminal 30 is read by the payment apparatus 20 in order to perform the payment process. The present invention will not be confined to this configuration. For example, the payment system can be installed into an information code reading system in which a mobile terminal is used as a membership card, information codes successively displayed on the mobile terminal are used for authentication, wherein the displayed information codes are read by an information code reader. In this example, predetermined information, which has been described in the foregoing embodiments, is acquired by decoding the information codes, and the acquired predetermined information is used to perform processes (such as supply of services).

(3) Another modification concerns with the foregoing configuration in which the information code C3 is read to enable the mobile terminal 30 to acquire the first and second determining information from the payment apparatus 20.

The present invention is not limited to this acquiring configuration, but can be a configuration which uses, as the acquisition section, wireless communication systems including a NFC (Near Field Communication) systems the Internet, or a telephone line network.

EXPLANATION OF REFERENCE NUMBERS

10 . . . payment system (information code reading system)
20 . . . payment apparatus (information code reader)
21 . . . controller (reader-side interpreting section, information processing section, second determining information generating section)
22 . . . imaging unit (reader-side imaging unit)
23 . . . display unit (reader-side display unit)
27 . . . sensor
30 . . . mobile terminal
31 . . . controller (code generating section (first and second code generating sections)), display controller, terminal-side interpreting section, acquisition section, first determining information generating section)
32 . . . imaging unit (terminal-side imaging unit, acquisition section)
33 . . . display unit (terminal-side display unit)
36 . . . sensor
C1 . . . information code (first information code)
C2 . . . information code (second information code)
C3 . . . information code (third information code)

What is claimed is:

1. An information coder reading system, comprising:
a mobile terminal provided with a screen, an information code being displayed on the screen; and
an information code reader that optically reads the information code from the mobile terminal so as to acquire predetermined information from the mobile terminal,
wherein the mobile terminal comprises a first controller configured to
acquire information from the information code reader, and
generate an information code,
a terminal-side display provided with a screen and configured to display, on the screen, the information code generated by the first controller, and
wherein the first controller is configured to control the terminal-side display; and
wherein the information code reader comprises
an optical camera configured to image the information code displayed on the screen of the terminal-side display, and
a second controller configured to
interpret the information code imaged by the optical camera, and
perform a process which uses interpreted results of the information code,
wherein
the first controller is configured to generate a first information code based on both the predetermined information and first determining information,
the first controller is configured to enable the terminal-side display to display the first information code on the screen thereof in response to the first information code generated by the code generating section,
the first controller is configured to acquire, from the information code reader, both second determining information and the first determining information interpreted by the second controller in response to the first information code being imaged by the optical camera,
the first controller is configured to generate a second information code based on the second determining information acquired together with the first determining information when the information acquired by the first controller includes the first determining information,
the first controller is configured to update the terminal-side display so as to change display of the first information code on the screen to display of the second information code on the screen, and
the second controller is configured to perform a process based on the predetermined information interpreted together with the first determining information by the second controller in response to imaging the first information code, when the second controller interprets the second determining information in response to the second information code imaged by the optical camera.

2. The information code reading system of claim 1, wherein
the first controller is configured to generate the first information code based on both the predetermined information and the first determining information,
the first controller is configured to generate the second information code based on the second determining information acquired together with the first determining information if the information acquired by the first controller includes the first determining information and the first information code is generated based on both the predetermined information and the first determining information, and
the second controller is configured to perform a process based on the predetermined information interpreted together with the first determining information if the second determining information is interpreted by the second controller in response to imaging the second information code by the optical camera.

3. The information code reading system of claim 1, wherein
the first controller is configured to generate the first information code based on the first determining information,
the first controller is configured to generate the second information code based on both the predetermined information and the second determining information acquired together with the first determining information if the information acquired by the first controller includes the first determining information and the first information code is generated based on the first determining information, and
the second controller is configured to perform a process based on the predetermined information interpreted together with the second determining information if the second determining information and the predetermined information are interpreted by the second controller in response to imaging the second information code by the optical camera.

4. The information code reading system of claim 1, wherein
the information code reader comprises a reader-side display capable of displaying a third information code generated based on the first and second determining information, and
the mobile terminal comprises
a second optical camera configured to image the third information code displayed by the reader-side display, and wherein the first controller is configured to obtain the first and second determining information by interpreting the third information code imaged by the second optical camera.

5. The information code reading system of claim 1, wherein
the predetermined information is information in relation to payment, and
the second controller is configured to perform a payment process based on the information in relation to the payment, which is obtained by interpretation performed by the second controller.

6. The information code reading system of claim 1, wherein
the first controller is configured to generate the first determining information which is composed of random information.

7. The information code reading system of claim 6, wherein
the first controller is configured to generate the first determining information which is composed of random information, based on information sensed by at least any one sensor of the mobile terminal.

8. The information code reading system of claim 1, wherein
the second controller is configured to generate the second determining information which is composed of random information.

9. The information code reading system of claim 8, wherein
the second controller is configured to generate the first determining information which is composed of random information, based on information sensed by at least any one sensor of the information code reader.

10. A method of processing an information code in a system that includes (a) a mobile terminal with a terminal-side display with a screen and (b) an information code reader with an optical camera and a controller, the information code reader being communicable with the mobile terminal, comprising steps of:
making the mobile terminal generate a first information code serving as the information code, based on i) predetermined information and first determining information which are information in relation to identifying the mobile terminal or a user of the mobile terminal or ii) the first determining information;
making the mobile terminal control the terminal-side display to display the first information code on the screen;
making the optical camera image the first information code displayed on the screen;
making the information code reader interpret the first information code that was imaged by the optical camera;
making the information code reader determine whether or not, in association with imaging of a second information code by the optical camera, the controller has interpreted second determining information or both the second determining information and the predetermined information;
making the mobile terminal acquire, from the information code reader, the second determining information and the first determining information, where the first determining information was derived by the information code reader from the first information code displayed on the screen and imaged by the optical camera;
making the mobile terminal determine whether or not the acquired information includes the first determining information;
making the mobile terminal generate, when it is determined that the acquired information includes the first determining information, i) the second information code serving as the information code based on the second determining information acquired together with the first determining information in a case where the first information code is generated based on the predetermined information and the first determining information, or ii) the second information code serving as the information code based on both the second determining information acquired together with the first determining information and the predetermined information in a case where the first information code is generated based on the first determining information;
making the mobile terminal update the screen of the terminal-side display from a state where the first information code is displayed on the screen to another state where the second information code is displayed on the screen, in response to the second information code being generated; and
making the information code reader perform a process based on the predetermined information interpreted by the controller together with the first determining information or the second determining information, when the second determining information or both the second determining information and the predetermined information has been interpreted.

11. A mobile terminal comprising:
a first controller;
a terminal-side display with a screen, the terminal-side display being capable of displaying an information code on the screen and being communicable with an information code reader that includes a reader-side optical camera and a second controller, where the first controller is configured to
generate a first information code as the information code based on both predetermined information concerning identifying a user of the mobile terminal or identifying the mobile terminal itself and first identifying information or based on the first identifying information;
control the terminal-side display to display on the screen the first information code generated;
acquire, from the information code reader, second determining information and the first determining information obtained by decoding the first information code displayed on the screen and imaged in the information code reader;
determine whether or not information acquired by the first controller includes the first determining information;
generate a second information code serving as the information code, i) based on the second determining information acquired together with the first determining information when the first information code is generated based on both the predetermined information and the first determining information or ii) based on both the second determining information acquired together with the first determining information and the predetermined information when the first information code is generated based on the first determining information, in response to a determination of the first controller that the information acquired by the first controller includes the first determining information; and
update the terminal-side display from a screen state where the first information code has been displayed to a screen state where the second information code is displayed, when the first controller has generated the second information code, wherein the second controller is configured to cause the optical camera to image the first information code displayed on the screen of the terminal-side display, decode the first information code imaged by the reader-side optical camera, perform a second determination whether or not the second controller interprets the second determining information or both the determining information and the predetermined information, in response to imaging the second information code by the reader-side optical camera, and perform a process based on the first determining information or the predetermined information decoded together with the second determining information, when the second determining information or the second determining information and the predetermined information have been decoded by the second determination.

\* \* \* \* \*